United States Patent

Williams et al.

Patent Number: 5,867,287
Date of Patent: Feb. 2, 1999

[54] HEAD UP DISPLAY WITH A LENS DECENTERED TO THE OPTICAL AXIS OF THE ILLUMINATION

[75] Inventors: Robert D. Williams, Agoura Hills; Daniel M. Battista, Hawthorne; Alan J. Reuter, Lawndale; John J. Ferrer, Tehachape, all of Calif.

[73] Assignee: Hughes Aircraft Company, Los Angeles, Calif.

[21] Appl. No.: 316,146

[22] Filed: Sep. 30, 1994

[51] Int. Cl.$^6$ .......................... G02F 1/1335; G03H 1/00; G02B 27/14

[52] U.S. Cl. ............................. 359/40; 359/13; 359/630

[58] Field of Search .............................. 359/13, 14, 40, 359/69, 630

[56] References Cited

U.S. PATENT DOCUMENTS 4,799,765  1/1989  Ferrer ........................................ 359/13
5,231,379  7/1993  Wood et al. ............................. 359/630

Primary Examiner—Anita Pellman Gross
Assistant Examiner—Toan Ton
Attorney, Agent, or Firm—Leonard A. Alkov; Wanda K. Denson-Low

[57] ABSTRACT

A low cost, compact projection display source that serves as a very bright image source for an automotive head up display. The present invention is comprised of a high intensity halogen light source and a liquid crystal display. The liquid crystal display is controlled by display electronics that write images onto the liquid crystal display that are to be displayed to the driver or passengers of a vehicle. Light output from the high intensity light source is transmitted through a piece of infrared energy absorbing glass, a decentered lens, such as a Fresnel lens, and a diffuser that uniformly backlights the liquid crystal display. Crossed polarizers are used on either side of the liquid crystal display. The high intensity light output transmitted by the liquid crystal display is passed through a yellow-orange output window which is projected onto a toric combiner for display to the driver of the vehicle. A fan provides cooling for the liquid crystal display and display circuitry that interfaces between the display electronics and the liquid crystal display. The projection display source produces a very high contrast (very bright) image source without heat problems. The projection display source is capable of producing 20,000 foot-lamberts of light energy output. The projection display source is the brightest known image source for non-military head up displays of either the non-reconfigurable or reconfigurable variety. The yellow-orange color used for the output window of the projection display source is used to maximize color contrast with the display background.

13 Claims, 5 Drawing Sheets

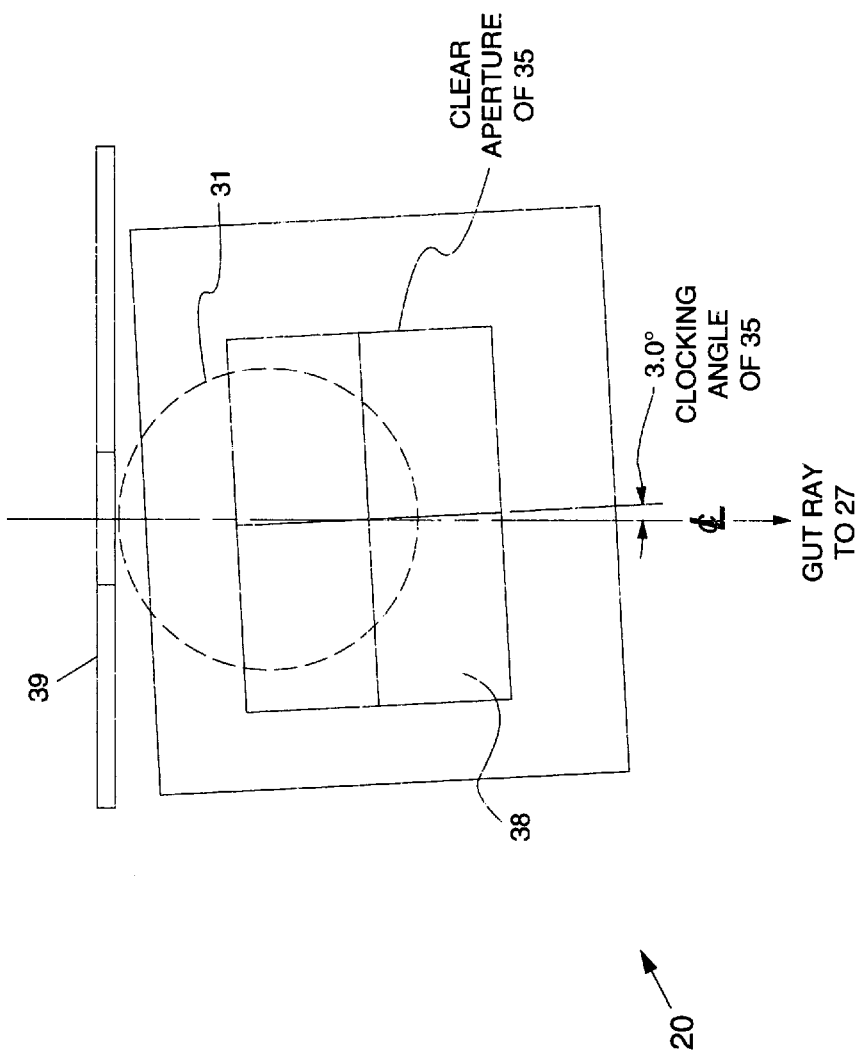

HEAD UP DISPLAY WITH A LENS DECENTERED TO THE OPTICAL AXIS OF THE ILLUMINATION

BACKGROUND

The present invention relates to head up displays, and more particularly, to a high intensity head up display image source for use with head up displays, and the like.

In recent years, there has been a great deal of effort relating to the development of head up displays for use in automotive vehicles. For example, the assignee of the present invention has developed a head up display system for use by law enforcement personnel, for example. This head up display system provides for virtual display of images and data derived from a number of sources, including radar, television, and a mobile data terminal that is linked by way of a communications link to law enforcement computers. However, it has been found that a high brightness image source is required for optimum performance of the system under high ambient light conditions encountered during daytime use.

The closest prior art in terms of brightness is a vacuum fluorescent display (VFD) image source. The vacuum fluorescent displays are non-reconfigurable. The brightest VFD provides a light output of about 7,000 foot-lamberts. Heretofore available head up display sources have not produced images at high brightness levels.

Therefore, it is an objective of the present invention to provide for a high brightness image source for use in head up display systems, and the like.

SUMMARY OF THE INVENTION

In order to meet the above and other objectives, the present invention is a low cost, compact projection display source that serves as a very bright image source for an automotive head up display (HED), for example disposed in a vehicle. The present invention is comprised of an illumination source (high intensity light source) and a liquid crystal display (LCD). The liquid crystal display is controlled by display electronics that writes images onto the liquid crystal display that are to be displayed to the driver or passengers of the vehicle.

The projection display source is innovative in its both its simplicity and compact size. The projection display source uses a high intensity halogen light source, for example, whose light output is transmitted through an (infrared) absorbing glass filter, a decentered Fresnel lens, and a diffuser that uniformly backlights the liquid crystal display. Crossed polarizers (S-polarization and P-polarization) are used on either side of the liquid crystal display. The high intensity light output transmitted by the liquid crystal display is passed through a yellow-orange output window and is projected onto a toric combiner for display to the driver of the vehicle. A fan provides cooling for the liquid crystal display a nd display circuitry used to interface between the display electronics and the liquid crystal display.

In its current configuration, the projection display source is mounted to the headliner of an automobile between the driver and passenger. The projection display source projects an image onto the toric combiner mounted on the windshield of the automobile which creates a virtual image approximately 12 ft beyond the driver's eyes.

The projection display source produces a very high contrast (very bright) image without the heat problems typically associated with conventional liquid crystal display sources. The projection display source described herein is capable of producing 20,000 foot-lamberts. The projection display source is the brightest known image source for non-military head up displays of either the non-reconfigurable or reconfigurable variety.

The yellow-orange color used for the output window of the projection display source is selected to maximize color contrast with the display background. The green color used in most conventional head up displays is selected for its photopic dominance alone without regard to color contrast, as is the case with the present invention.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIGS. 3a–3c illustrate angular relationships and separation distances between selected components of the projection display source of FIG. 1.

DETAILED DESCRIPTION

Figure 1:
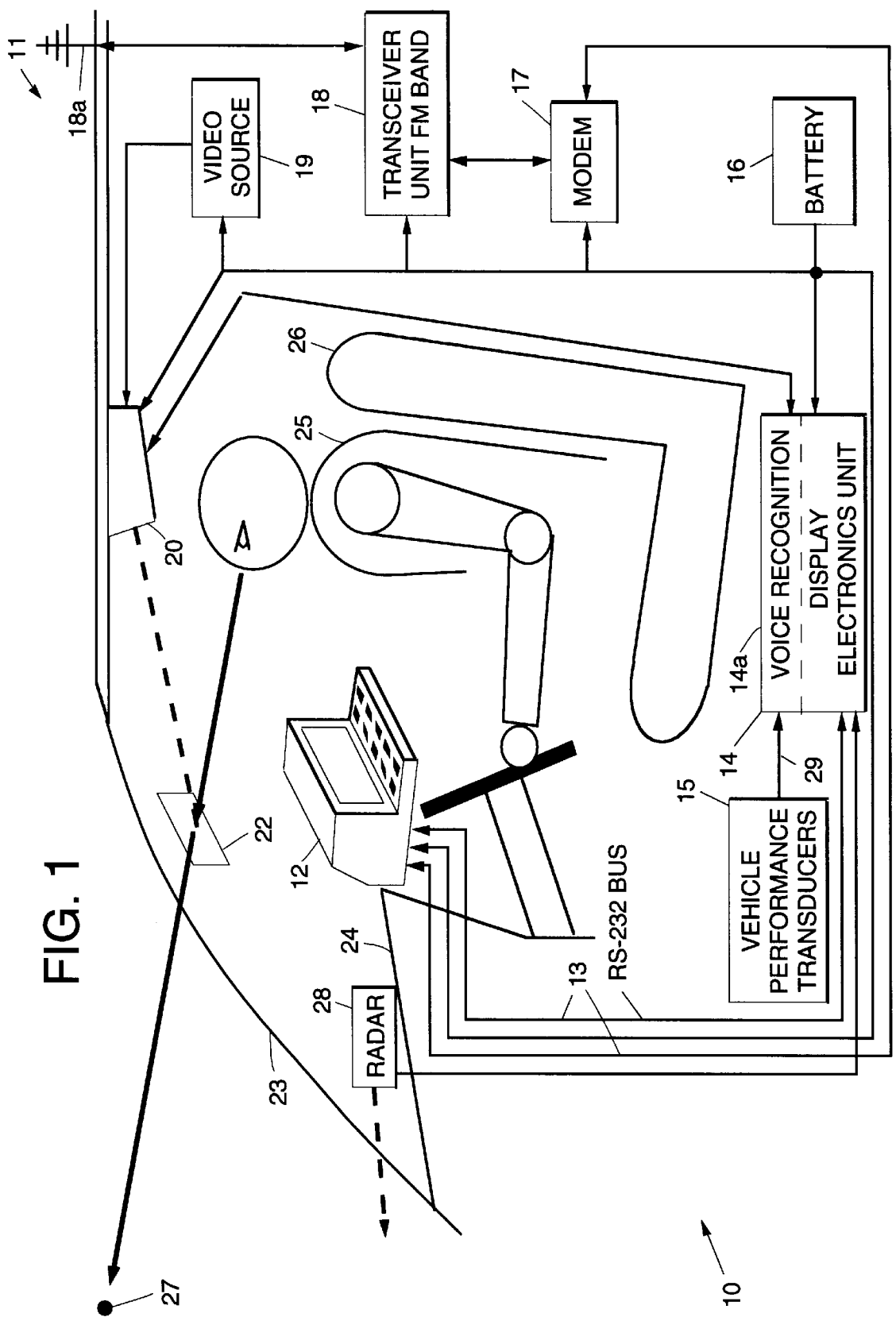
FIG. 1 illustrates a head up display projection system incorporating a reconfigurable, high brightness projection display source in accordance with the principles of the present invention.

Referring to the drawing figures, FIG. 1 illustrates a head up display system 10 incorporating a reconfigurable, high brightness projection display source 20 in accordance with the principles of the present invention. The embodiment of the head up display system 10 shown in FIG. 1 is described in detail in U.S. patent application Ser. No. 08/026,887 filed Mar. 5, 1993, entitled "Virtual Image Display Management System With Head-Up Display", assigned to the assignee of the present invention, and is incorporated herein in its entirety by reference.

The embodiment of the head up display system 10 shown in FIG. 1 illustrates a portion of a vehicle 11 having a front windshield 23, and an operator 25 is sitting in a seat 26 in front of a dashboard 24. The system 10 includes a head-up-display projection display source 20 that projects an image at an optical (toric) combiner 22, and produces a virtual image 27 at a predefined distance in front of the windshield 23. The location of the virtual image 27 is chosen to be at a comfortable viewing distance for the operator 25, typically on the order of twelve feet or so.

The system 10 is comprised of a display electronics unit 14 that is coupled to vehicle performance transducers 15 disposed on the vehicle by way of a plurality of analog and logic channels 29. The display electronic unit 14 is also coupled to the projection display source 20, to a radar 28, and to a mobile data terminal 12 by way of an RS-232 bus 13. The mobile data terminal 12 may be one that is manufactured by Motorola and that is in general use in the law enforcement industry. The mobile data terminal 12 is generally well known to those skilled in the art relating to the present invention. The mobile data terminal 12 is also coupled to a modem 17 by way of the RS-232 bus 13. The modem 17 is in turn coupled to an FM band transceiver unit 18 having an RF antenna 18a mounted to the roof of the vehicle 11. A video source 19 is coupled to the projection display source 20. A power supply or battery 16 is coupled to each of the electronic components in the system 10 in a conventional manner.

The display electronics unit 14 incorporates various interfaces and a reconfigurable processor that provides for control over the projection display source 20 and manages the various data input sources or subsystems that make up the system 10 to control the data that is displayed to the operator 25. The display electronics unit 14 is coupled to each of the subsystems to which the system 10 interfaces and from which the system 10 is to display data. Such connections are made using conventional data ports (RS-232 or IEEE 488) and analog and digital communications channels. Such connections and the communication between subsystems is accomplished in a routine manner.

The use of the reconfigurable processor in the display electronics unit 14 and the reconfigurable liquid crystal display 32 makes the overall system 10 reconfigurable, when compared to conventional vacuum fluorescent display projectors. Such vacuum fluorescent display projectors are not reconfigurable.

Figure 2:
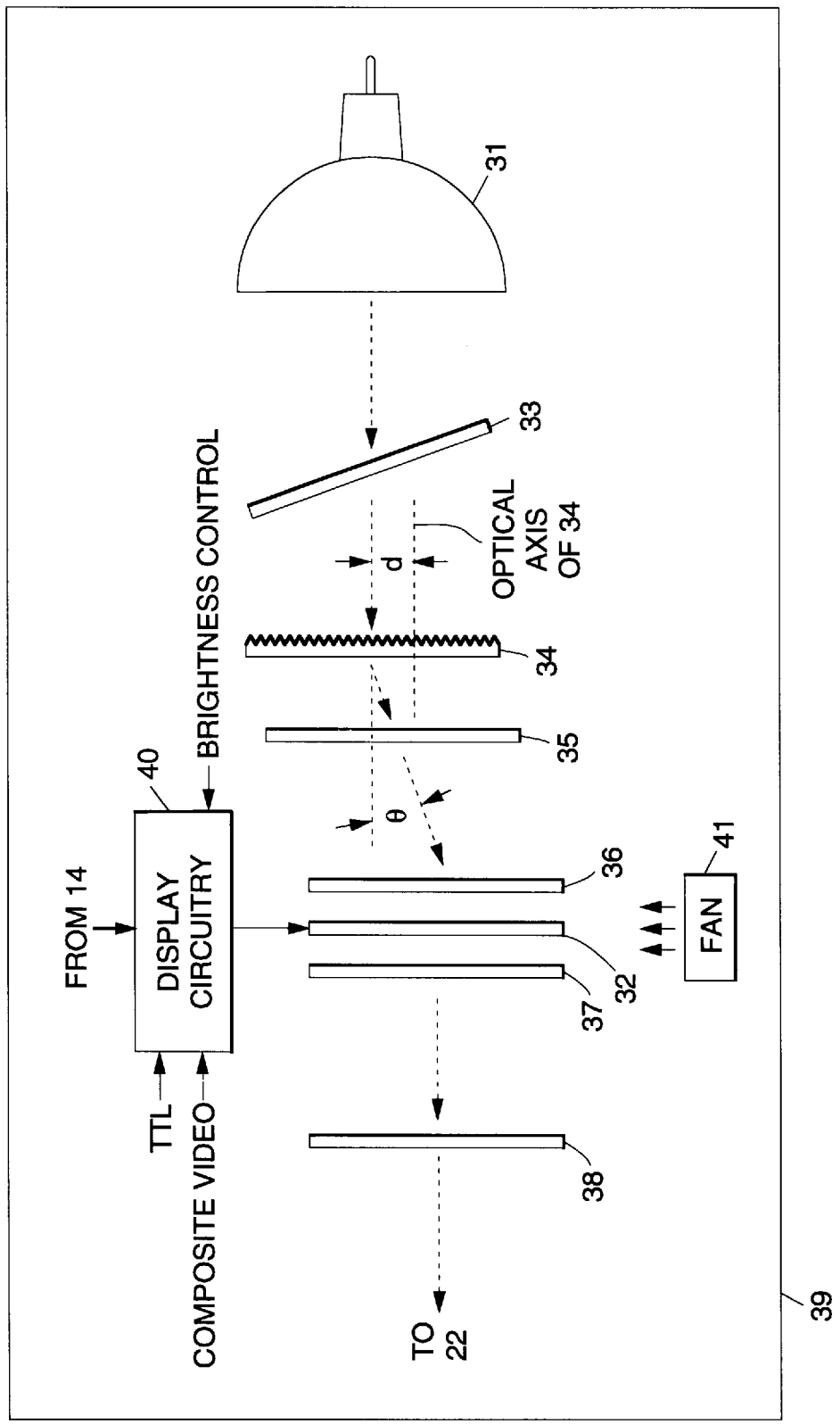
FIG. 2 illustrates details of the projection display source of FIG. 1.

Referring to FIG. 2, it illustrates details of the reconfigurable, high brightness projection display source 20 of FIG. 1. The projection display source 20 is comprised of a housing 39 that secures an illumination source 31 and a liquid crystal display (LCD) 32 with a series of optical elements disposed therebetween. Display circuitry 40 is coupled to the liquid crystal display 32 and comprises TTL and composite video input ports and a brightness control circuit for the liquid crystal display 32. The liquid crystal display 32 is controlled by the display electronics unit 14 which couples data and images by way of the TTL and composite video inputs onto the liquid crystal display 32 that are to be displayed to the operator 25 or passengers of the vehicle 11. A fan 41 provides cooling for the liquid crystal display 32 and the display circuitry 40, and the lamp 31.

The illumination source 31 may be a high intensity halogen light source 31, for example, whose light output is transmitted through an infrared energy absorbing filter 33, a decentered Fresnel lens 34, and a diffuser 35 that uniformly backlights the liquid crystal display 32. The Fresnel lens 34 is decentered to refract light at an angle so that it is imaged onto the combiner 22. The equation used to determine the distance (d) that the Fresnel lens 34 is decentered is:

q=arctan (d/f), where f is the focal length of the Fresnel lens 34.

The diffuser 35 is used so that the projected light from the projection source 20 completely illuminates the surface of the combiner 22. The infrared filter 33 may be provided by a piece of Schott KG2 heat absorbing glass, for example. Crossed (45°) polarizers 36, 37 (S-polarization and P-polarization) are disposed on either side of the liquid crystal display 32. The high intensity light output from the liquid crystal display 32 is passed through a yellow-orange output window 38 which is projected onto the toric combiner 22 for display to the operator 25 of the vehicle 11. The Fresnel lens 34, diffuser 35, and output window 38 may be made of plastic material, such as polycarbonate, for example.

Figure 3A:
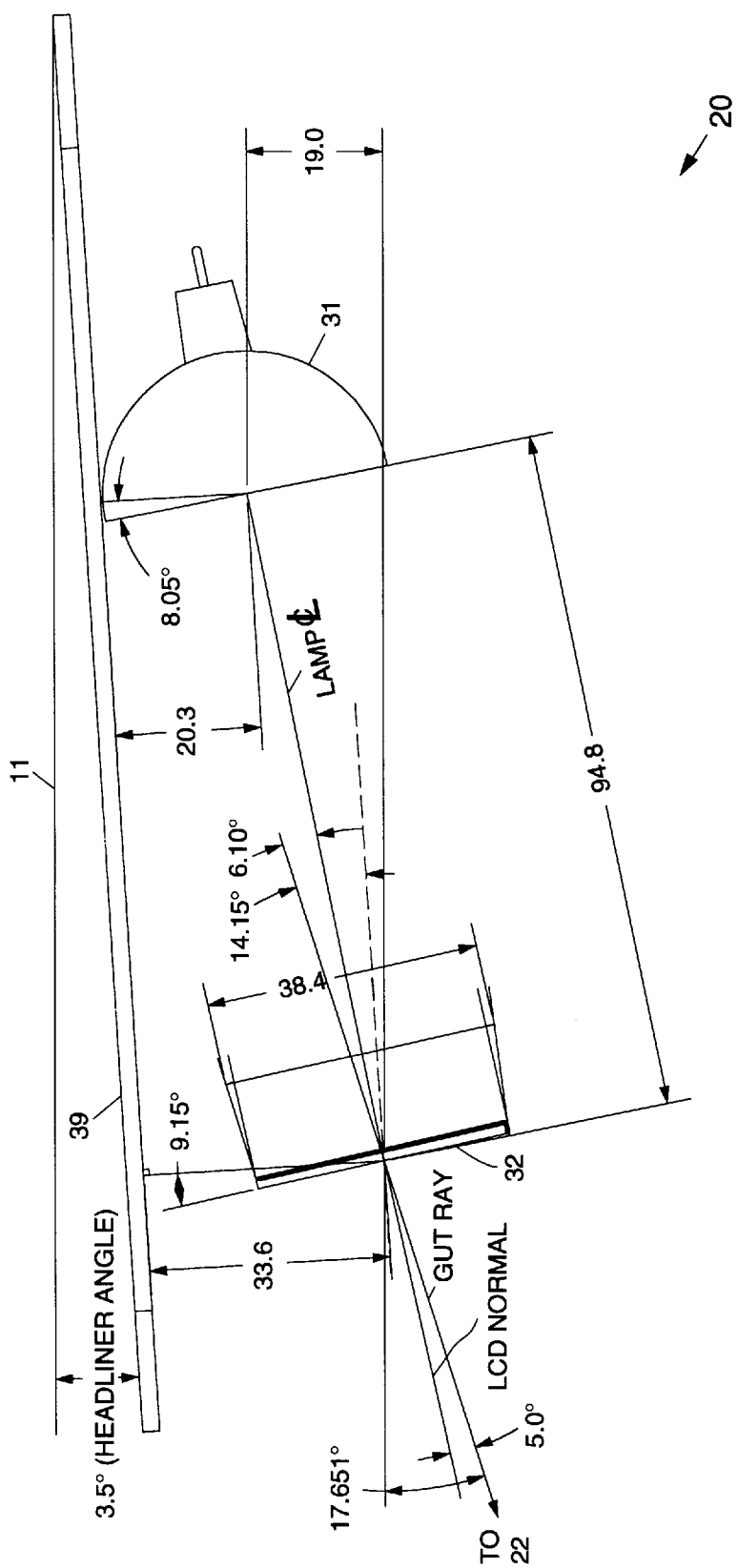
Figure 3B:
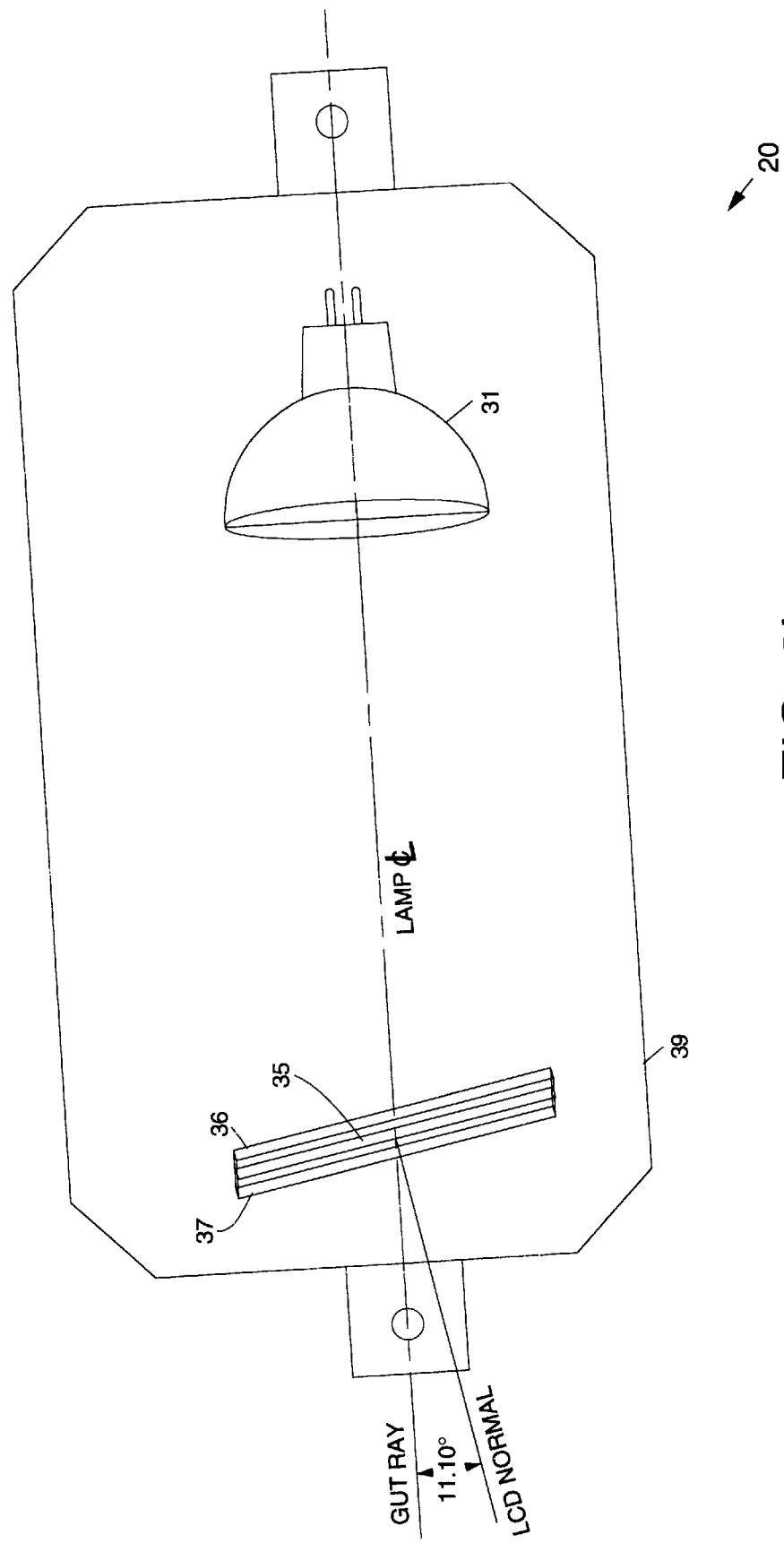

FIGS. 3a–3c illustrate angular relationships (in degrees) and separation distances (in millimeters) between selected components of the projection display source 20 of FIG. 1. As is shown in FIG. 1, the projection display source 20 is mounted to a headliner of the vehicle 11 between the operator 25 and front seat passenger. The projection display source 20 projects an image onto the toric combiner 22 which is mounted on the windshield 23 of the vehicle 11.

The projection display source 20 creates a virtual image approximately twelve feet beyond the eyes of the operator 25 in front of the vehicle 11.

In the embodiment illustrated in FIG. 2, the light source 31 is a halogen bulb that is mounted in a holding apparatus (not shown). Light from the light source 31 passes through the infrared absorbing filter 33 and then through the decentered Fresnel lens 34 which helps create a more uniform light distribution across the liquid crystal display 32. An LCD housing or cartridge (not shown) contains the diffuser 35, the crossed polarizers 37, 38 which comprise a 45 degree linear polarizer, and the liquid crystal display 32. The image transmitted by the liquid crystal display 32 passes through the yellow-orange window 38 which serves to increase contrast of the projected image relative to the background. The liquid crystal display 32 projects an image onto the toric combiner 22 which is mounted slightly below the rear view mirror of the vehicle 11. The fan 41 cools the liquid crystal display 32 and the display circuitry 40. The size of a reduced to practice embodiment of the projection display source 20 is about 10.5 inches long by 6.2 inches wide by 4.3 inches high.

Thus there has been described a new and improved reconfigurable, high brightness projection display source for use in head up display systems, and the like. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A high brightness projection image source for use in a head up display system, said display source comprising:

an illumination source disposed at one end of an optical path;

a lens that is decentered relative to an optical axis of the illumination source disposed along the optical path;

a diffuser disposed along the optical path adjacent to the lens;

a liquid crystal display disposed along the optical path adjacent to the diffuser;

first and second crossed polarizers disposed along the optical path on opposite sides of the liquid crystal display; and an output window disposed adjacent to the liquid crystal display at an opposite end of the optical path.

2. The image source of claim 1 which further comprises an infrared absorbing filter disposed along the optical path adjacent to the illumination source.

3. The image source of claim 1 which further comprises a display electronics unit coupled to the liquid crystal display for writing images onto the liquid crystal display that are to be displayed.

4. The image source of claim 1 wherein the illumination source comprises a halogen light source.

5. The image source of claim 2 wherein the infrared absorbing filter comprises infrared energy absorbing glass.

6. The image source of claim 1 wherein the output window comprises a yellow-orange output window.

7. The image source of claim 1 which further comprises a fan for cooling the liquid crystal display.

8. The image source of claim 1 wherein the lens comprises a Fresnel lens.

9. A high brightness projection image source for use in a head up display system comprising an optical combiner that projects a virtual image in front of the optical combiner, said display comprising:

a halogen illumination source disposed at one end of an optical path;

a lens that is decentered relative to an optical axis of the illumination source disposed along the optical path;

a diffuser -disposed along the optical path adjacent to the lens;

a liquid crystal display disposed along the optical path adjacent to the diffuser;

first and second crossed polarizers disposed along the optical path on opposite sides of the liquid crystal display;

an output window disposed adjacent to the liquid crystal display at an opposite end of the optical path; and a fan for cooling the liquid crystal display.

10. The image source of claim 9 which further comprises an infrared absorbing filter disposed along the optical path adjacent to the halogen illumination source.

11. The image source of claim 10 wherein the infrared absorbing filter comprises infrared energy absorbing glass.

12. The image source of claim 9 wherein the output window comprises a yellow-orange output window.

13. A high brightness projection image source for use in a head up display system comprising an optical combiner that projects a virtual image in front of the optical combiner, said display source comprising:

a halogen illumination source disposed at one end of an optical path;

an infrared absorbing filter disposed along the optical path adjacent to the halogen illumination source;

a Fresnel lens that is decentered relative to an optical axis of the illumination source disposed along the optical path adjacent to the infrared absorbing filter;

a diffuser disposed along the optical path adjacent to the Fresnel lens;

a liquid crystal display disposed along the optical path adjacent to the diffuser;

first and second crossed polarizers disposed along the optical path on opposite sides of the liquid crystal display;

a yellow-orange output window disposed adjacent to the liquid crystal display at an opposite end of the optical path; and a fan for cooling the liquid crystal display.

\* \* \* \* \*